Sept. 6, 1938.　　S. J. BOUGHTON　　2,129,259
GEAR CHANGE OPERATING MEANS
Filed June 4, 1934　　3 Sheets-Sheet 1
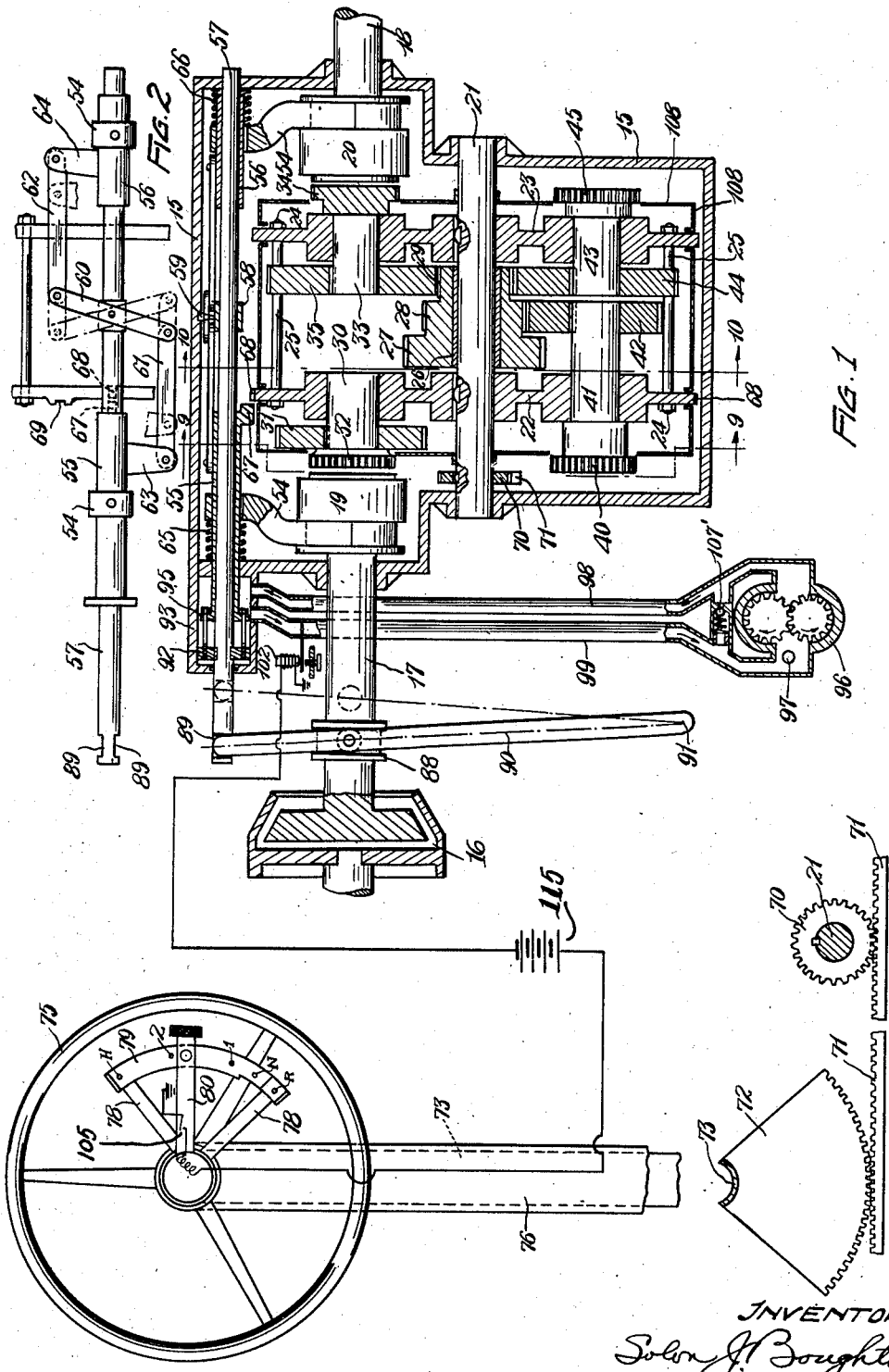
INVENTOR:
Solon J. Boughton

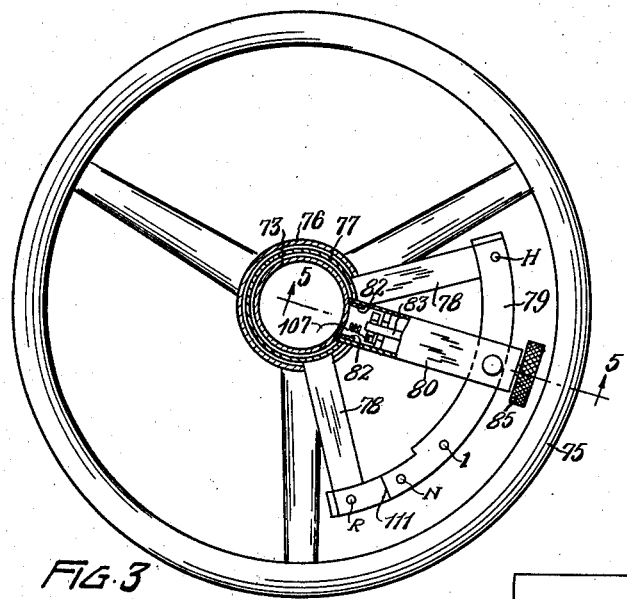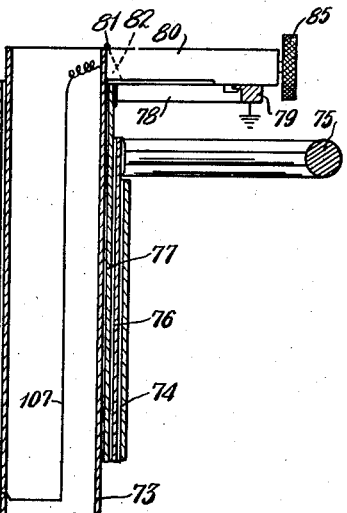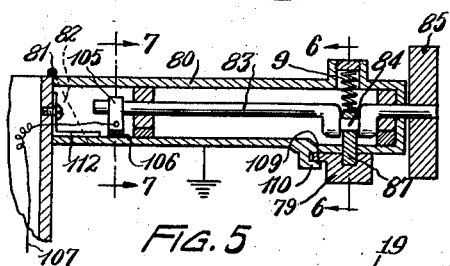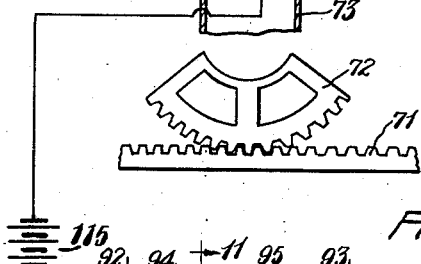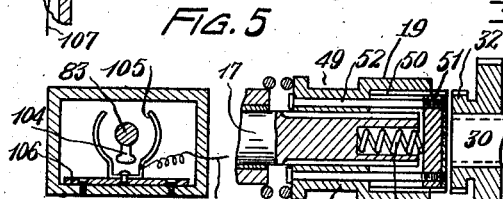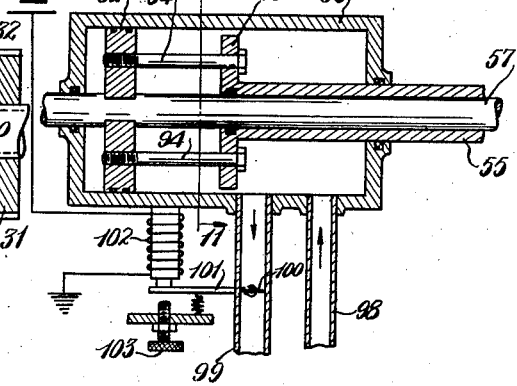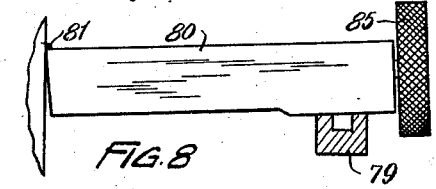

Sept. 6, 1938. S. J. BOUGHTON 2,129,259
GEAR CHANGE OPERATING MEANS
Filed June 4, 1934 3 Sheets-Sheet 3

INVENTOR:
Solon J. Boughton

Patented Sept. 6, 1938

2,129,259

UNITED STATES PATENT OFFICE 2,129,259

GEAR CHANGE OPERATING MEANS

Solon J. Boughton, Shaker Heights, Ohio

Application June 4, 1934, Serial No. 728,852

15 Claims. (Cl. 192—3.5)

This invention relates to improvements in gear change operating means, that is to say mechanism for changing the speed ratios in a transmission, particularly a transmission for an automotive vehicle, including as one aspect of the invention a manually controlled power operated clutch.

One of the objects of the invention is the provision of means, conveniently located upon the steering post of an automotive vehicle, for revolving or controlling the revolution of the gear carrier of a revoluble gear carrier type of transmission.

Another object is the provision of means for preventing the accidental shifting of the carrier to the reverse gear position.

Another object is the provision of means associated with the gear shifting or control lever for effecting the actuation of the vehicle clutch, and particularly means so constructed and arranged that it must be operated to effect declutching before the lever can be moved, and will necessarily be operated to effect clutching after the lever has reached a new gear position and has been released by the operator.

Still another object is the provision of means for reducing to a minimum the dragging effect of the grease in the transmission casing, thereby facilitating the revolution of the gear carrier, particularly in cold weather.

Other objects and features of novelty will appear as I proceed with the description of those embodiments of the invention which, for the purposes of the present application, I have illustrated in the accompanying drawings, in which Fig. 1 is a diagrammatic view of a change speed transmission of the revoluble carrier type together with a shift lever and operating connections therefor, and a power clutch actuator with control means therefor incorporated in the shift lever.

Fig. 2 is a plan view illustrating the dog clutch disengaging means.

Fig. 3 is an enlarged view, partly broken away and partly in section, of a steering wheel for an automotive vehicle, showing my shift lever and associated parts.

Fig. 4 is a vertical sectional view, largely diagrammatic, illustrating a hydraulic clutch actuator, with electrical control means, and including the steering post of an automotive vehicle through which the electric control circuit extends.

Fig. 5 is a vertical sectional view taken substantially on the line 5—5 of Fig. 3.

Fig. 6 is a developed vertical sectional view through a quadrant for the shift lever, the position of the view being indicated by the line 6—6 of Fig. 5.

Fig. 7 is a detail sectional view on a larger scale, taken substantially along the line 7—7 of Fig. 5.

Fig. 8 is an elevational view of the shift lever in the reverse gear position with the quadrant shown in cross section substantially along the line 8—8 of Fig. 6.

Figure 10:
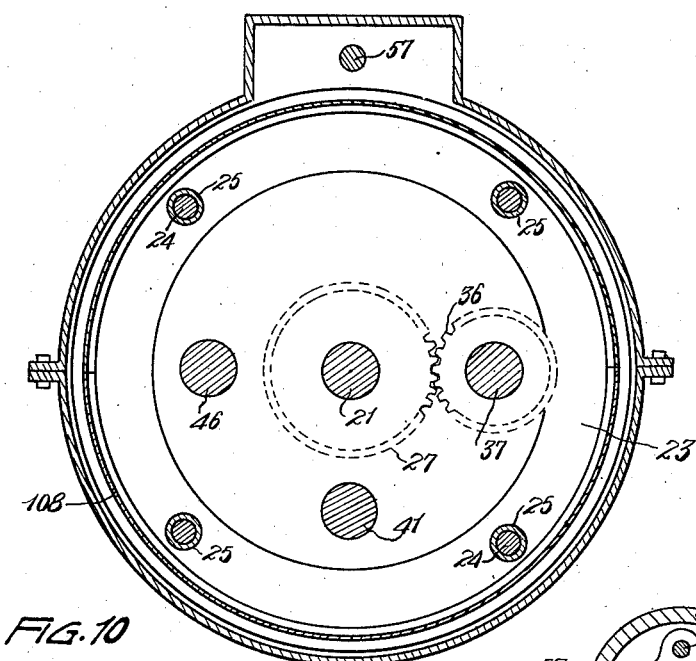
Figure 9:
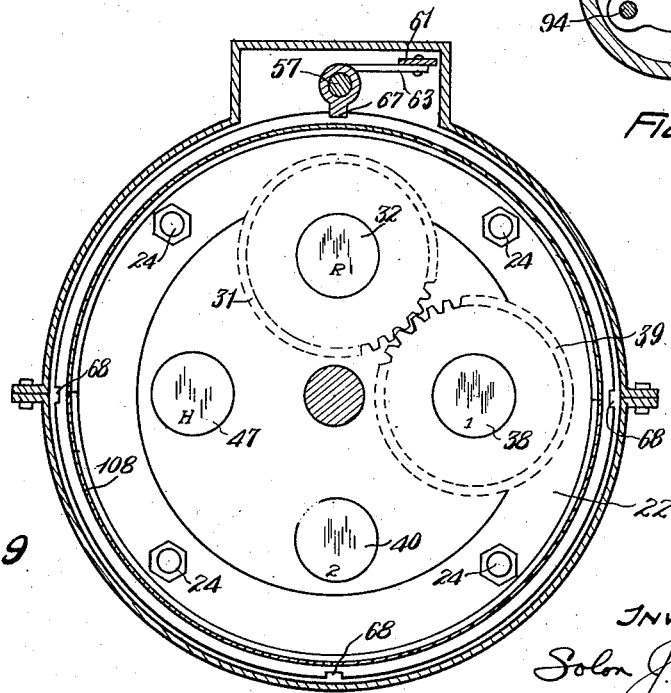

Figs. 9 and 10 are transverse sectional views taken substantially along the lines 9—9 and 10—10, respectively, of Fig. 1.

Figure 11:
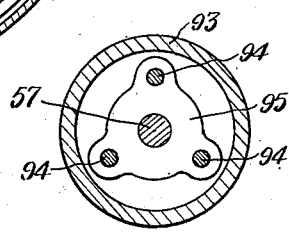

Fig. 11 is a detail sectional view taken substantially along the line 11—11 of Fig. 4, and Fig. 12 is a detail sectional view of a dog clutch element with a synchronizer incorporated therein.

The present invention is concerned principally with the manipulation of the gear carrier in a revoluble gear carrier type of transmission, such as is disclosed in my prior Patent No. 1,815,034, issued July 21, 1931.

As illustrated in Fig. 1, the transmission may include a casing 15 which is rigidly supported in the vehicle to the rear of a conventional clutch, diagrammatically illustrated at 16. A shaft 17 extends from the clutch through a bearing in the casing 15. In alignment with the shaft 17 there is a driven shaft 18, mounted in a bearing in the rear wall of casing 15. The shafts 17 and 18 carry dog clutch elements 19 and 20 respectively, which are slidably keyed or splined to the shafts. In the casing 15, parallel with aligned shafts 17 and 18, there is a jack shaft 21 which is oscillatable in bearings in the casing. Shaft 21 supports the gear carrier.

The gear carrier in this case consists of a pair of circular end plates 22 and 23 which are keyed to the shaft 21 and are joined together and braced by a plurality of rods or bolts 24. Spacing sleeves 25 surround these bolts between the plates 22 and 23. On the shaft 21 between the carrier plates 22 and 23 there is an elongated antifriction bushing or bearing 26 upon which rotates a nest of three gears 27, 28 and 29, which together form the countershaft gears for each of the gear trains. There are three such trains, reverse gear, first gear and second gear and, in addition, there is direct drive. It will be obvious that a greater or smaller number of gear trains could be provided if desired.

The carrier as illustrated in Fig. 1 is in the reverse gear position. The carrier plate 22 has mounted therein a short shaft 30 which extends forward and has keyed thereon a gear 31 and a dog clutch element 32 which is adapted to be engaged by the dog clutch element 19. Mounted in the other carrier plate 23 in alignment with the shaft 30 there is another short shaft 33 with a dog clutch element 34 on its outer end and with a gear 35 keyed on its inner end. The gear 35 meshes at all times with the countershaft gear 29. Referring to Fig. 10, it will be seen that gear 27 meshes with a relatively small gear 36 that is keyed to a shaft 37 positioned 90° away from shaft 30. Shaft 37 is a short shaft journaled in carrier plate 22. On its outer extremity and in front of plate 22 this shaft carries a dog clutch element 38 identical with the clutch element 32, while behind the clutch element 38 is a gear 39 which meshes with gear 31.

The drive for reverse gear, coming from shaft 17, is transmitted through dog clutch elements 19 and 32 to gear 31, thence through gear 39 to shaft 37, and by way of gear 36 to countershaft gear 27, thence from countershaft gear 29 to gear 35 on shaft 33 and out to the propeller shaft through dog clutch elements 34 and 20.

For first speed the gear carrier is rotated through an angle of 90° from the position illustrated, causing dog clutch element 38 to come into alignment with clutch element 19. Drive takes place through clutch elements 19 and 38, shaft 37, and gear 36 to countershaft gear 27, and thence through countershaft gear 29 to another gear like the gear 35 but in alignment with gear 36, and out to the propeller shaft. When the gear carrier is rotated 180° from the position illustrated in Fig. 1, a dog clutch element 40 is brought into alignment with clutch element 19. Clutch element 40 is keyed to a short shaft 41 journaled in carrier plate 22. On the inner end of this shaft there is keyed a gear 42 which meshes with the middle gear 28 of the countershaft gears. Another short shaft 43 is journaled in carrier plate 23 in alignment with shaft 41, and on its inner end there is keyed a gear 44 which meshes with countershaft gear 29. A dog clutch element 45 is keyed to the outer or rear end of shaft 43 and is adapted to be engaged by clutch element 20. When this second speed train is in operative position 180° from the position illustrated in Fig. 1, driving force may be transmitted from shaft 17 through clutch elements 19 and 40 to shaft 41, thence through gear 42 to countershaft gear 28, thence through gears 29 and 44 to shaft 43, and thence through clutch elements 45 and 20 out to the propeller shaft.

High speed position is 270° in a clockwise direction from the position shown in Figs. 9 and 10. It does not include any speed train, but embodies a shaft 46 which extends entirely through the carrier and is journaled in both of the end plates 22 and 23 thereof being provided on its extremities with dog clutch elements 47 identical with the elements 32 and 34 and the corresponding elements of the other gear trains.

In Fig. 1 the dog clutch elements 19 and 20 are shown in their withdrawn or disengaged positions. These elements preferably, although not necessarily, include some form of synchronizer. An example is illustrated in Fig. 12. The clutch element includes a portion 48 which is slidable upon shaft 17, these two parts being held against relative rotation by interengaging splines. This part of the clutch is provided with an annular groove 49. The remaining portion of the clutch is cup-shaped. Teeth 50 are formed on its inner wall, and these teeth are adapted to engage with the external teeth on the clutch elements carried by the shafts in the revoluble carrier. The synchronizer herein illustrated consists of a disk 51 having friction material on its outer surface and provided with external teeth slidably fitting the teeth 50. A plurality of pins 52 are threaded into the disk 51 and are slidable through holes formed in the part 48 of the clutch element, these pins having headed ends for engagement with the end surface of the clutch element. A coil spring 53 seated in a socket in the extremity of the shaft 17 tends to advance the disk 51 into frictional engagement with the outer surface of the clutch element 32, assuming that the transmission is in the position illustrated in Fig. 1. When the clutch element 19 is retracted the pins 52 prevent this frictional engagement, but when the clutch element 19 is moved toward the clutch element 32 the disk 51 is permitted to engage the clutch element 32 and the frictional contact between them tends to bring them to the same rotational speed. The movement of the element 19 then continuing causes the teeth 50 to advance beyond the disk 51 and slide into engagement with the teeth on clutch element 32, without clash.

The annular grooves in clutch elements 19 and 20 are engaged by shifting forks 54 which are attached to sleeves 55 and 56 that are slidably mounted upon a rod 57 which extends entirely through the casing 15 and is slidable therein. A smaller sleeve 58 is mounted on rod 57 intermediate the sleeves 55 and 56, and is provided with a pivot pin 59 which extends upwardly into a socket in the top of the casing 15, by means of which arrangement the sleeve 58 is held in fixed position. On the pivot pin 59 there is rotatably mounted a lever 60 which is connected at its ends by links 61 and 62 with ears 63 and 64 extending laterally from the sleeves 55 and 56. It will be obvious that when the sleeve 55 is moved toward the right in Figs. 1 and 2 the sleeve 56 will be moved toward the left, and vice versa. Springs 65 and 66 surrounding the sleeves 55 and 56 may be used to exert pressure on the dog clutch elements 19 and 20 tending to move them into operative position.

Sleeve 55 is provided with a detent 67 which is adapted to engage with any one of four notches 68 in the periphery of the carrier plate 22, these notches being positioned in radial alignment with the different gear train positions.

Neutral position of the carrier is half-way between reverse position and first speed position. For neutral position I prefer to hold the clutch elements 19 and 20 retracted or in the positions illustrated in Fig. 1, and for this purpose I provide a slightly raised socket 69 on the side of the carrier plate 22, as shown in Fig. 2, whereby the sleeve 55 is held back against the action of spring 65.

As an example of means for revolving the gear carrier from one speed position to another, I have illustrated herein a gear 70 keyed to shaft 21, which may be rotated by suitable means, as by a rack 71. This rack may project through the casing 15 and may be moved by any convenient means. The movement of the rack may be accomplished manually if desired by means comprising a sector 72 on the lower end of a tube 73 which is oscillatably mounted within the steering post 74 of the vehicle. The portions of the rack 71 engaged by the sector 72 and the gear 70 may or may not be in alignment and may or may not be directly connected.

As indicated in Fig. 4, the steering wheel 75 is mounted at the upper end of a tube 76 which is rotatably mounted within the tubular steering post 74. Inside the tube 76 there is a fixed tube 77 projecting upwardly beyond the tube 76, and upon the upper end of tube 77 there are mounted two diverging arms 78 which support a quadrant 79. The oscillatable tube 73 is positioned within the fixed tube 77, and extends upwardly therebeyond far enough to support a hollow shift lever 80, the connection between the tube and lever being a hinge 81 in order to permit a slight vertical swinging of the lever. Vertical projections 82 on the tube 73 extending into the hollow lever carry part of the strain caused by lever movements.

Within the hollow lever 80 there is rotatably mounted a shaft 83 upon which is a crank 84. A hand-wheel 85 on a protruding extremity of the shaft affords means for oscillating the same. A yoke 86 receives the crank 84 on the shaft and is adapted to be raised from the position of Fig. 6 by movement of the shaft in either direction from its position of rest. A detent 87 projects downwardly from the yoke 86 and is adapted to enter any one of five sockets R, N, 1, 2 and H in the top of quadrant 79, which sockets are positioned to correspond with the various gear positions of the gear carrier 22, 23 for reverse, neutral, 1st speed, 2nd speed and high speed, respectively. A coil spring 9 tends to hold the yoke 86 and detent 87 in their lower position.

Where hereinafter the phrase "gear shift control element" is employed it is intended to signify the lever 80 and any part or parts which may be directly connected therewith, as for instance the tube 73 and the gear sector 72 in the embodiment illustrated.

As indicated in Fig. 1, a movable element of the service clutch 16 is connected with a collar 88 which is keyed to slide on shaft 17. This collar is provided with a peripheral groove which may be engaged by the shifting fork of a conventional clutch lever, and connections may be arranged also between this lever and the sleeve 55, preferably through rod 57, for the purpose of operating sleeves 55 and 56, by which the dog clutch elements are connected or disconnected. Operation of the main and dog clutches manually in this manner is quite satisfactory, but still greater ease and speed of gear shifting may be obtained by the use of an electrically controlled power actuator for the main and dog clutches, which will now be described.

In the forward end of rod 57 there are flats 89 which afford means for engagement with a clutch lever which is indicated by 90, the lever being pivoted at 91. This lever also has a fork engaging the collar 88 for the main clutch 16.

A piston 92 is fixed upon the rod 57 and is slidably mounted in a cylinder 93 which may be connected with the forward end of casing 15. A plurality of rods 94 are threaded into the piston 92 and extend slidably through openings formed in a flange 95 on the forward end of sleeve 55. The flange 95 is not a piston, and in fact it may be nothing more than a spider. Heads on the rods 94 serve to prevent separation of the piston 92 and flange 95 beyond a predetermined extent. Obviously, when the piston 92 moves forward the rod 57 moves with it, and the collar 88 moves forward at the same time, beginning the disengagement of the main clutch 16. As soon as the slack afforded by the rods 94 is taken up, the flange 95 and the sleeve 55 also move forward for the disengagement of the dog clutches.

In the present instance the piston 92 is operated by hydraulic means. 96 is a gear pump driven by the engine of the vehicle. It may be located in the engine oil sump and may have a connection with the pool of oil in the sump, as indicated at 97. This pump runs constantly and causes oil to circulate through a conductor 98 up to cylinder 93 and back through a conductor 99 to the pump. A valve 100 in return pipe 99 is normally open, permitting free circulation of the oil. When this valve is closed however, oil pressure builds up rapidly in the cylinder 93 causing piston 92 to move to the left, operating the clutches. The valve 100 is provided with a crank 101 which constitutes the armature of an electromagnet 102. When this magnet is energized the crank 101 is raised to the position of Fig. 4, closing the valve. A set screw 103 serves as an adjustable abutment for the crank 101, thereby determining the size of the oil passage around the valve 100, and consequently the speed with which the cylinder 93 may be emptied. This provides an effective means for regulating the engaging action of the clutches to secure rapid engagement without grabbing.

On the rear end of shaft 83 in hollow shift lever 80, there is a contact 104 which is adapted to engage with the circular portions of a spring contact finger 105 whenever the shaft 83 is turned through a small angle from the normal position thereof. This finger 105 is mounted upon an insulating base 106 which is secured to the bottom wall of the lever 80. An insulated electrical conductor 107 is connected with finger 105 and passes down through the tube 73 in the steering post through battery 115 and thence to electromagnet 102. The end of this conductor is grounded, and the shaft 83 is also grounded.

It will be seen, therefore, that when the handwheel 85 on the end of the shaft 83 is turned to lift the detent 87, an electrical circuit will be set up through electromagnet 102 which will close valve 100 and cause the clutches to be disengaged preparatory to the movement of the lever 80 for shifting the gear carrier from one position to another. When the operator desires to disengage the main clutch 16 without shifting gears, he simply turns the hand-wheel 85. The clutch lever 90 may be provided with a foot pedal for use in emergencies if desired.

In order to provide a circuit for oil around the pump when the piston is in the forward or actuated position, a safety valve 107' is located in a by-pass between the sides of the line, as indicated in Fig. 1.

The revolving parts of the gear carrier are preferably enclosed by a sheet metal cylinder 108 separating the grease within the cylinder from that outside of the cylinder and providing a smooth surface of revolution, whereby the revolution of the carrier is not materially interfered with by the drag of the grease even in the coldest weather.

On that portion of the quadrant 79 in which the sockets 1, 2 and H are located I may provide a rib or flange 109 which is adapted to be engaged by a hook 110 on the lever 80, preventing the lever from being swung on its hinge 81 when anywhere in the forward speed range. The quadrant 79 has a stop wall 111 in position to be engaged by the lever 80 when the latter is turned to neutral position. In order to make a shift to reverse gear position, it is necessary for the operator to lift the outer end of lever 80 against the action of a spring 112 in order to get it over the stop 111. Accidental shifting into reverse position is thereby avoided.

Having thus described my invention, I claim:

1. In an automotive vehicle, a steering post, a steering wheel, a clutch, a transmission of the revolving gear carrier type, means for revolving said gear carrier to bring the desired gear train into operative position, a shift lever mounted to turn about an axis extending lengthwise of said steering post and operatively connected with said carrier revolving means, and means associated with said lever for controlling said clutch.

2. In an automotive vehicle, a steering post, a steering wheel, a clutch, a transmission of the revolving gear carrier type, means for revolving said gear carrier to bring the desired gear train into operative position, an oscillatable tube mounted within the steering post and extending upwardly beyond the steering wheel, a shift lever attached to and projecting outwardly from the upper end of said oscillatable tube, an operative connection between the lower end of said tube and said carrier revolving means, and means associated with said lever for controlling said clutch.

3. In an automotive vehicle, a steering post, a steering wheel, a clutch, a constant mesh change speed transmission of a kind to be shifted by continuous movement of one character from neutral or any forward speed to any higher forward speed and vice versa, means for shifting said transmission, an oscillatable tube mounted within the steering post and extending upwardly beyond said steering wheel, a shift lever attached to and projecting outwardly from the upper end of said oscillatable tube, an operative connection between the lower end of said tube and said means for shifting the transmission, and means associated with said lever for controlling said clutch.

4. In an automotive vehicle, a motor, a steering post, a transmission, a clutch interposed between the motor and transmission, a gear shift lever at the top of said post operatively connected with said transmission, an electric switch carried by said lever, means at the free end of the lever for operating said switch, means actuated by said motor for operating said clutch, and electrical means in circuit with said switch for controlling said power actuated means.

5. In an automotive vehicle, a transmission, a clutch, a shaft, operative connections between one end of said shaft and said transmission for changing the transmission from one speed to another, a fixed quadrant at the other end of the shaft having recesses therein corresponding with the different speed positions of the transmission, a shift lever attached to the last named end of said shaft and running over said quadrant, a spring detent carried by the lever adapted to enter any one of said recesses, an element at the free end of the lever rotatable for withdrawing said detent, and means associated with said relatively movable element for controlling said clutch, and bodily movable for moving said lever over its quadrant.

6. In an automotive vehicle, a motor, a transmission, a clutch interposed between the motor and transmission, a shaft, operative connections between one end of said shaft and said transmission for changing the transmission from one speed to another, a fixed quadrant at the other end of the shaft having recesses therein corresponding with the different speed positions of the transmission, a shift lever attached to the last named end of said shaft and running over said quadrant, a spring detent carried by the lever adapted to enter any one of said recesses, an electric switch carried by the lever, means actuated by said motor for operating said clutch, electric means in circuit with said switch for controlling said motor actuated means, and an element at the free end of the lever rotatable for withdrawing said detent and closing said switch, and bodily movable for moving said lever over its quadrant.

7. In an automotive vehicle, a gear shift lever mounted to swing, a quadrant over which said lever runs, said quadrant having gear positions in the order of reverse, neutral, first, second and high speeds, a stop on the quadrant between the reverse and neutral positions, means permitting relative movement of the stop and lever at right angles to the quadrant in order that the lever may be moved from neutral to reverse position, clutch control means, and means associated with said lever for operating said clutch control means.

8. In an automotive vehicle, a gear shift lever mounted to swing about an upright axis, a quadrant over which said lever runs, said quadrant having one level for neutral and forward gear positions and a higher level for reverse gear position, said lever having a hinged joint therein permitting the outer portion of the lever beyond the hinge to be moved from the lower level of the quadrant to the higher level thereof and vice versa, clutch control means, and means associated with said lever for operating said clutch control means.

9. In an automotive vehicle, a motor, a transmission, a clutch interposed between the motor and transmission, a gear shift control element operatively connected with said transmission, an electric switch carried by said control element, means at the free end of the control element for operating said switch, a hydraulic cylinder and piston for operating said clutch, means driven by the motor for circulating liquid through said cylinder, a valve on the return side of the liquid line, and electrical means in circuit with said switch for closing said valve, whereby pressure is built up in the cylinder.

10. In an automotive vehicle, a motor, a transmission, a clutch interposed between the motor and transmission, a gear shift lever operatively connected with said transmission, a hydraulic cylinder and piston for operating said clutch, means driven by the motor for circulating liquid through the cylinder, a valve on the return side of the liquid line, and means associated with said lever and adapted to be operated by the hand of the operator on the lever for opening and closing said valve.

11. In an automotive vehicle, a motor, a transmission, a clutch interposed between the motor and transmission, a gear shift control element operatively connected with said transmission, a hydraulic cylinder and piston for operating said clutch, means driven by the motor for circulating liquid through the cylinder, a valve on the return side of the liquid line, means associated with said control element and adapted to be operated by the hand of the operator on the control element for opening and closing said valve, and a by-pass with a spring loaded valve therein arranged across said liquid line for preventing excessive pressure in the line.

12. In an automotive vehicle, a motor, a transmission, a clutch interposed between the motor and transmission, a gear shift control element operatively connected with said transmission, a hydraulic cylinder and piston for operating said clutch, means driven by the motor for circulating liquid through the cylinder, a valve for controlling the flow of liquid through said line, and means associated with said control element and adapted to be actuated by the hand of the operator on the control element for opening and closing said valve.

13. In an automotive vehicle, a steering post, a steering wheel, a clutch, a transmission of the revolving gear carrier type, means for revolving said gear carrier to bring the desired gear train into operative position, a gear shift control element mounted to turn about an axis extending lengthwise of said steering post and adapted to effect actuation of said gear carrier revolving means, and means associated with said gear shift control element for effecting operation of said clutch.

14. In an automotive vehicle, a motor, a steering post, a transmission, a clutch interposed between the motor and transmission, a gear shift control element operatively connected with said transmission, comprising a lever at the top of said post, an electric switch carried by said lever, means at the free end of said lever for operating said switch, power actuated means for operating said clutch, and electrical means in circuit with said switch for controlling said power actuated means.

15. In an automotive vehicle, a transmission, a clutch, a quadrant, a gear shift control element comprising a lever arranged to swing about the center of the quadrant and running over the quadrant, said quadrant having recesses therein corresponding with the different speed positions of the transmission, a spring detent carried by the lever adapted to enter any one of said recesses, means set in operation by the movement of said control element from one speed position to another for effecting a corresponding shift of the transmission, rotatable means at the free end of the lever for withdrawing said detent and bodily movable for moving said lever over its quadrant, and means associated with said rotatable means for controlling the actuation of said clutch.

SOLON J. BOUGHTON.